US011271628B2

(12) United States Patent
Hadjichirstos et al.

(10) Patent No.: US 11,271,628 B2
(45) Date of Patent: Mar. 8, 2022

(54) METHODS AND APPARATUS FOR BEAMFORMING

(71) Applicant: Mixcomm, Inc., Chatham, NJ (US)

(72) Inventors: Aristotele Hadjichirstos, San Diego, CA (US); Harish Krishnaswamy, New York, NY (US); Arun Natarajan, Corvallis, OR (US); Frank Lane, Easton, PA (US)

(73) Assignee: Mixcomm, Inc., Chatham, NJ (US)

( * ) Notice: Subject to any disclaimer, the term of this patent is extended or adjusted under 35 U.S.C. 154(b) by 0 days.

(21) Appl. No.: 17/117,002

(22) Filed: Dec. 9, 2020

(65) Prior Publication Data

US 2022/0021430 A1  Jan. 20, 2022

Related U.S. Application Data

(60) Provisional application No. 63/053,690, filed on Jul. 19, 2020.

(51) Int. Cl.
*H04B 7/06* (2006.01)
*H04B 7/0426* (2017.01)
*H04B 1/04* (2006.01)

(52) U.S. Cl.
CPC ............ *H04B 7/0617* (2013.01); *H04B 1/04* (2013.01); *H04B 7/043* (2013.01); *H04B 7/0619* (2013.01); *H04B 2001/0408* (2013.01)

(58) Field of Classification Search
CPC ...... H04B 7/0617; H04B 1/04; H04B 7/0619; H04B 7/043; H04B 2001/0408
See application file for complete search history.

(56) References Cited

U.S. PATENT DOCUMENTS

2017/0353288 A1* 12/2017 Brannon ................ H04B 1/525
2020/0403649 A1* 12/2020 Alexanderson ......... H03F 3/245
2020/0412423 A1* 12/2020 Kim ..................... H04L 25/4921

OTHER PUBLICATIONS

International Search Report and Written Opinion of the International Searching Authority from PCT/US2021/042127, dated Aug. 12, 2021, 1-7 pages.

\* cited by examiner

*Primary Examiner* — Vineeta S Panwalkar
(74) *Attorney, Agent, or Firm* — Straub & Straub; Michael P. Straub; Stephen T. Straub (57) ABSTRACT

A communications apparatus which supports beamforming is described. The communications apparatus includes an array of N beam forming circuits, each of the N beamforming circuits including an RF signal input coupled to a phase shifter, an attenuator and a power amplifier. The communications apparatus further includes an array of antenna elements, each one of the N beamforming circuits including an output coupled to a different one of the antenna elements in the array of antenna elements; and a set of beam tables including control values used to selectively control elements of the beamforming circuits. The beam tables include sets of control values which are accessed and used to control components of the beamforming circuits depending on the beam angle to be used during a given time period. A feedback circuit generate EVM control information based on output signals from the beam forming circuits.

17 Claims, 6 Drawing Sheets

METHODS AND APPARATUS FOR BEAMFORMING

RELATED APPLICATIONS

The present application claims the benefit of U.S. Provisional Application Ser. No. 63/053,690 which was filed on Jul. 19, 2020 and which is hereby expressly incorporated by reference in its entirety.

FIELD

The present application relates to beamforming methods and apparatus and more particularly to methods and apparatus for beamforming in which error vector magnitude (EVM) optimization is supported, e.g., via load-line and/or amplifier bias control which can be used for 5G mm wave applications.

BACKGROUND

Active mmWave antenna beamforming arrays suffer from Power Amplifier (PA) non-linearities as the power and phase of each beam is changed, and Error Vector Magnitude (EVM) is negatively affected. These nonlinearities can be, and sometimes are, caused by: i) Intrinsic PA non-linearity as the PA is operated closer to compression (required to maintain a high PA efficiency that yields lower heat generation in the beam forming front-end module (FEM)); and ii) Load-line PA variation because of PA interaction in the antenna array.

In view of the above, it should be appreciated that there is a need for methods and/or apparatus which allow for a beamforming system, e.g., transmitter and/or receiver system, to be implemented in which error vector magnitude (EVM) optimization can be supported through the use of one or more methods or apparatus.

SUMMARY

A communications apparatus which supports beamforming is described. The communications apparatus includes an array of N beamforming circuits, each of the N beamforming circuits including an RF signal input coupled to a phase shifter, an attenuator and a power amplifier. The exemplary communications apparatus further includes an array of antenna elements, each one of the N beamforming circuits including an output coupled to a different one of the antenna elements in the array of antenna elements; and a set of beam tables including control values used to selectively control elements of the beamforming circuits. The beam tables include sets of control values which are accessed and used to control components of the beamforming circuits depending on the beam angle to be used during a given time period. A feedback circuit generates EVM control information based on output signals obtained the beamforming circuits. The EVM control signal is supplied to the beam tables and used, in some embodiments, to determine one or more bias and capacitance control values used to control one or more components in the power amplifiers of the beamforming circuits.

By using feedback and sets of beam tables, along with controllable phase, attenuator and/or power amplifiers, improvements in error vector magnitude (EVM) can be achieved as compared to systems with fewer controllable components and/or which lack feedback control.

Numerous features and variations are discussed in the detailed description which follows.

DETAILED DESCRIPTION

Figure 1:
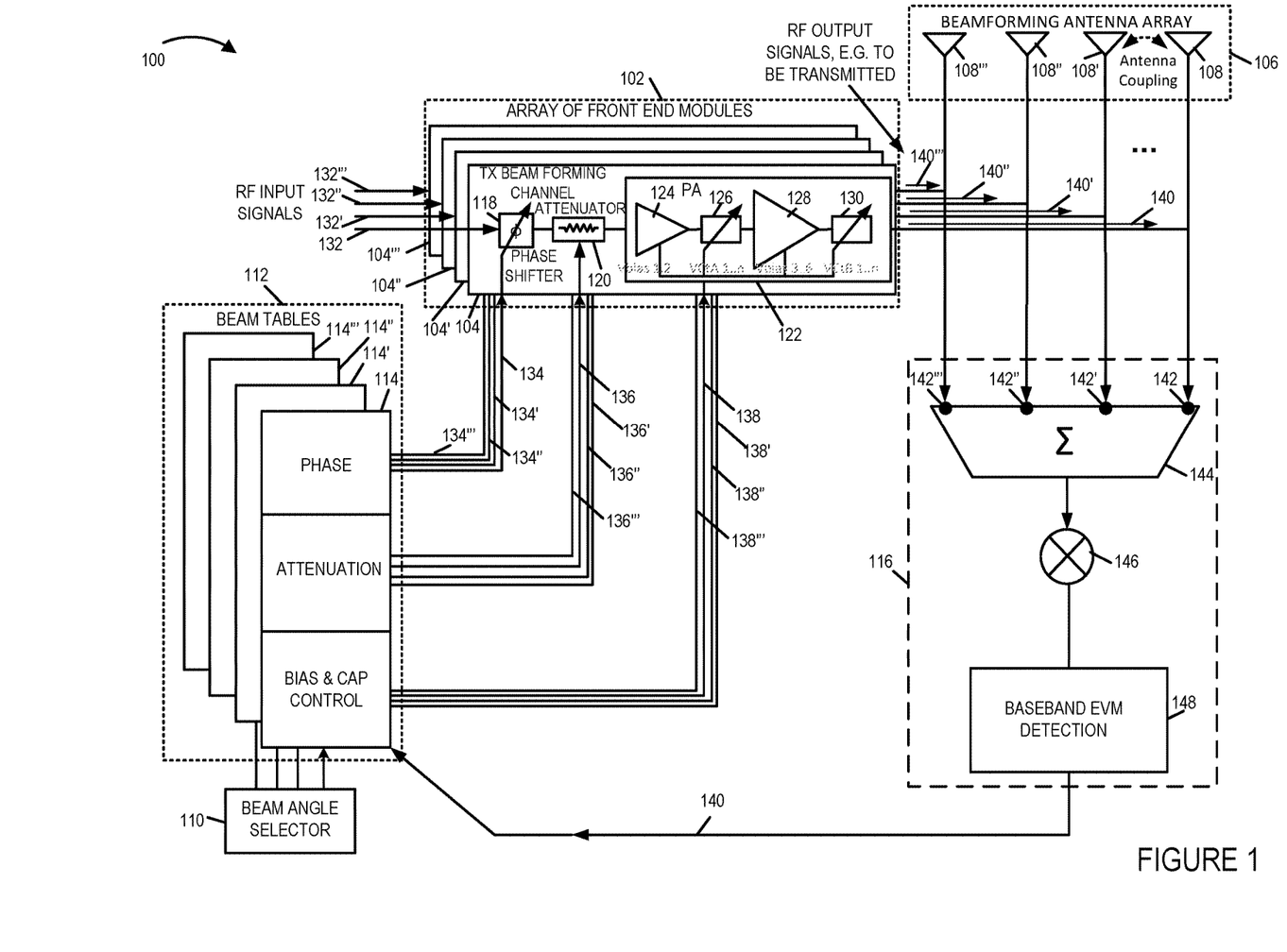
FIG. 1 is a drawing of an exemplary mmWave programmable front-end module (FEM) system level schematic in accordance with an exemplary embodiment.
Figure 2:
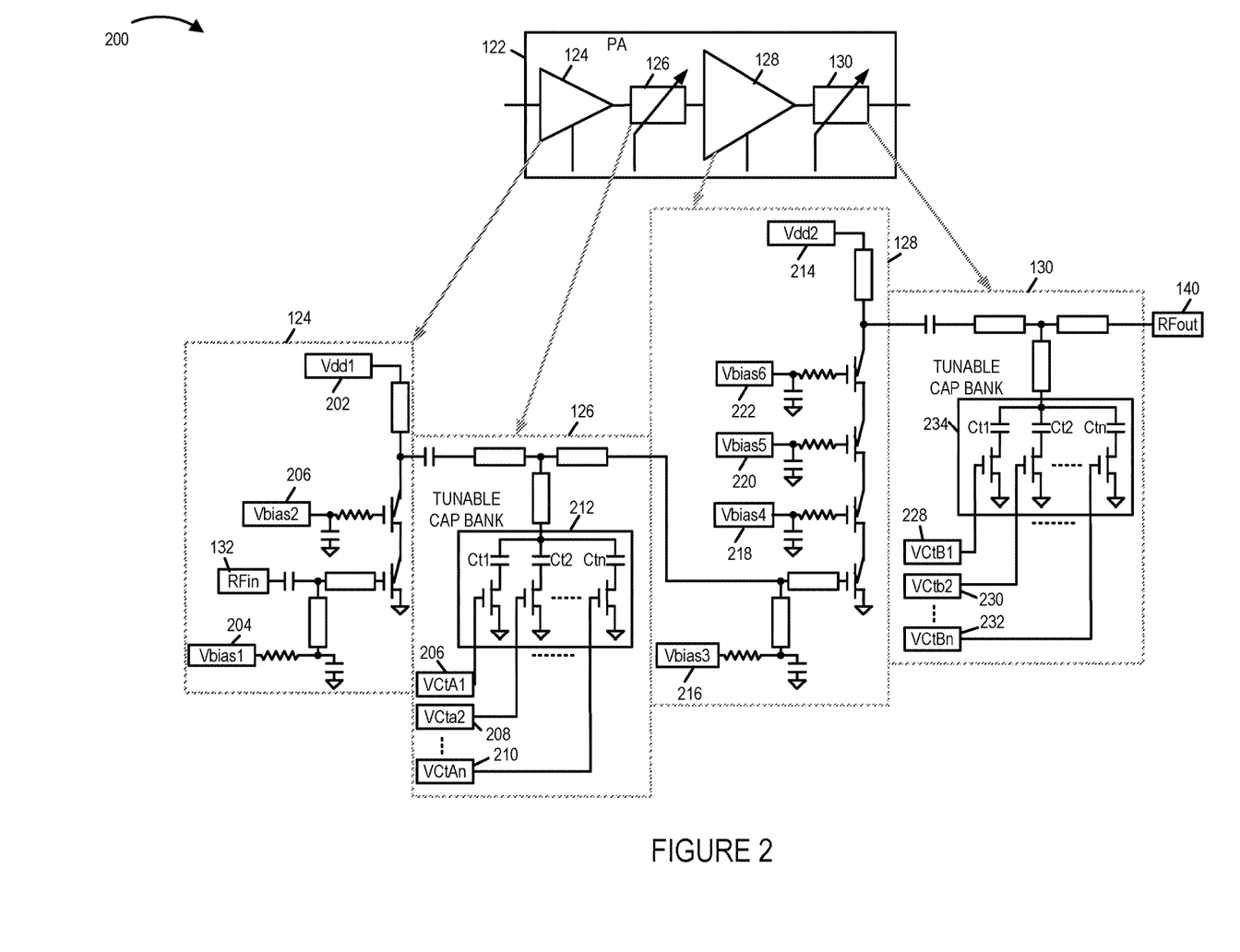
FIG. 2 is a drawing of an exemplary mmWave programmable Power Amplifier concept schematic in accordance with an exemplary embodiment.

In various embodiments, in accordance with the present invention, the bias point and the load-line of the beamforming power amplifiers are varied, as the power levels and phase angle are changed. This is depicted in FIG. 1 and FIG. 2.

In some embodiments the following elements are included, e.g., in the PAs, to implement the bias point and the load-line variations of the beamforming power amplifiers, as the power levels and phase angle are changed. Programmable switchable bias circuitry of the PAs is controlled. In some embodiments, the programming bits used to control amplifier bias are part of specific linearization register tables and/or the main beamforming tables. Both driver amplifier and output stage amplifier bias points (current) and gate voltages can be, and sometimes are, changed independently. PA bias programming, in some embodiments, is achieved by changing bias voltages, e.g., Vbias 1, 2, 3, 4, 5, 6.

Programmable inter-stage and output matching networks of the PAs. In some embodiments, the programming bits are part of specific linearization register tables and/or the main beamforming tables.

Matching network programming can be, and in some embodiments, is achieved by changing the voltages VCtA 1, 2, . . . , n and VCtB 1, 2, . . . , n.

The entries to these linearization tables, in some embodiments, are determined and stored during system bring-up.

FIG. 1 is a drawing of an exemplary mmWave programmable front-end module (FEM) system level schematic in accordance with an exemplary embodiment. The exemplary mmWave programmable front-end module (FEM) system 100 of FIG. 1 includes an array 102 of front end modules (TX beam forming channel 1 module 104, TX beam forming channel 2 module 104', TX beam forming channel module 3 104", . . . , TX beam forming channel module n 104'), a beam forming antenna array 106 including a plurality of antennas (antenna 1 108, antenna 2 108', antenna 3 108", . . . , antenna n 108'''), a beam angle selector 110, beam tables 112 including a plurality of beam tables (beam table 1 114, beam table 2 114', beam table 3 114", . . . , beam table n 114'''), and a feedback circuit 116. Each TX beam forming channel module (104, 104', 104", . . . , 104''') includes a phase shifter 118, an attenuator 120, and a power amplifier (PA) 122. The power amplifier 122 includes a first amplifier 124, a first tunable capacitor bank 126, a second amplifier 128, and a second tunable capacitor bank 130. Each TX beam forming channel module (104, 104', 104", . . . , 104''') receives: inputs RF signals (132, 132', 132", . . . 132''') to be transmitted (following processing by the TX beam forming channel module) and a set of control signals (phase control signal(s) (134, 134' 134", . . . , 134'''), attenuation control signal(s) (136, 136', 136", . . . 136'''), and bias and capacitor control signals (138, 138', 138", . . . , 138''') based on beam table values and a currently selected beam angle, and outputs an RF signal (140, 140', 140", 140''') which goes to a corresponding antenna (108, 108', 108", . . . , 108''') for transmission and to an input (142, 142', 142", . . . , 142') of the feedback control circuit 116. The phase control signal(s) controls a phase shifter 118 of the TX beam forming channel module, e.g., to set the phase shifter to a desired phase shift. The attenuator control signal(s) controls an attenuator 120 of the TX beam forming channel module, e.g., to set the attenuator to a desired attenuation level. The bias and cap control signals, e.g., bias voltage and control voltage signals, control elements within the PA (a first amplifier 124, a first tunable capacitor bank 126, a second amplifier 128, and a second capacitor bank 130) to be set to desired configuration.

The feedback circuit 116 includes a summer 144, which receives an output signal from each of the TX beamforming channel modules, a mixer 146 and a baseband Error Vector Magnitude (EVM) detector 148. The output 150 of the baseband EVM detector 148 is used to determine beam tables 112 control values. In various embodiments, the feedback circuit 116 is used during an initial calibration, e.g., to obtain beam tables 112 values.

FIG. 2 is a drawing 200 of an exemplary mmWave programmable Power Amplifier concept schematic in accordance with an exemplary embodiment. The programmable Power Amplifier shown in FIG. 2 is, e.g., any of the n power amplifiers 122 of then TX beamforming channel modules (104, 104', 104", . . . , 104') shown in FIG. 1.

The exemplary programmable Power Amplifier 122 includes a first amplifier 124, e.g., a driver amplifier, a first tunable capacitor bank circuit 126, a second amplifier 128, e.g., an output stage amplifier, and a second tunable capacitor bank circuit 130, coupled together as shown. The first amplifier 126 receives an RF input signal 132, a supply voltage Vdd1 202, and two bias voltage (Vbias1 204, Vbias 2 206) used for control, and outputs a signal to the input of the first tunable capacitor bank circuit 126. The first tunable capacitor bank circuit 126 includes voltage control signals (VCtA1 206, VCtA2 208, . . . , VCtAn 210) for tuning the first capacitor bank 212 of n capacitors. The output of the first capacitor bank circuit 126 is the input to the second amplifier 128. The second amplifier 128 receives the output signal from the first capacitor bank circuit 126 as an input signal, a supply voltage Vdd2 214, and four bias voltages (Vbias3 216, Vbias 4 218, Vbias 5 220, Vbias 6 222) used for control, and outputs a signal to the input of the second tunable capacitor bank circuit 130. The second tunable capacitor bank circuit 130 includes voltage control signals (VCtB1 228, VCtB2 230, . . . , VCtBn 232) for tuning the second capacitor bank 234 of n capacitors. The output of the second capacitor bank circuit 130 is an RF out signal 140, which is feed to an antenna for transmission.

Figure 3:
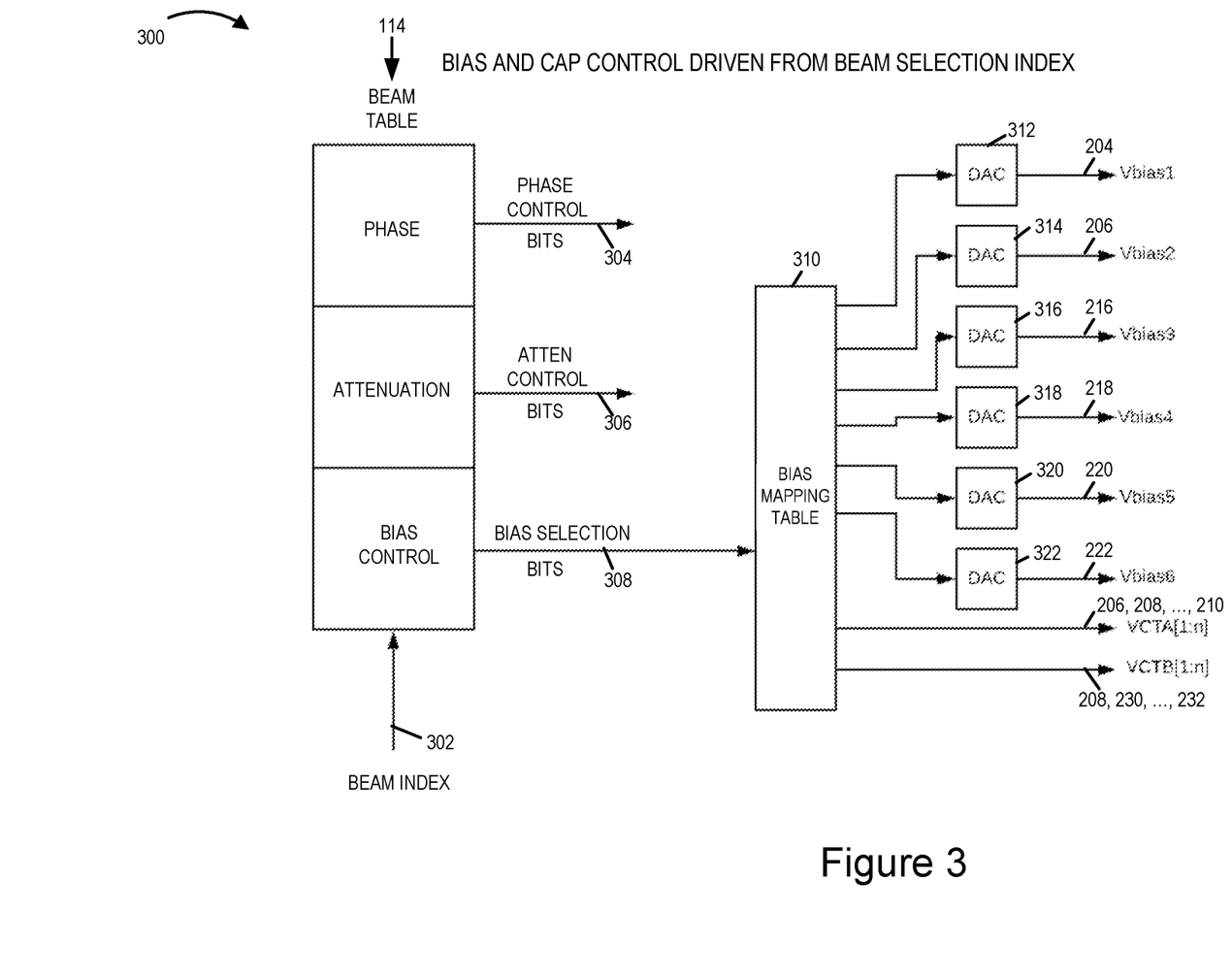
FIG. 3 is a drawing of an exemplary mmWave programmable system level concept schematic illustrating bias and cap control driven from beam selection index in accordance with an exemplary embodiment.

FIG. 3 is a drawing of an exemplary mmWave programmable system level concept schematic 300 illustrating bias and capacitor control driven from beam selection index in accordance with an exemplary embodiment. Based on a beam index value 302 and using the stored information of the beam table 114, phase control bit values 302 are determined, attenuation control bit values 304 are determined, and bias control bit values 308 are determined. The bias control bits 308, referred to as bias selection bits, are fed as input to a bias mapping table component. The bias mapping table component 310 which is coupled to digital to analog convertors (DACs) (312, 314, 315, 318, 320, 322), which receive output from the bias mapping table components, and the DACs (312, 314, 315, 318, 320, 322) generate analog voltages (Vbias 1 204, Vbias 2 206, Vbias 3 216, Vbias 4 218, Vbias 5 220, Vbias 6 222), which are input control signals used to control the first and second amplifiers (124, 128) of the PA 122. The bias mapping table component 310 also outputs VCTA[1:n] signals (206, 208, . . . , 210) and VCTB[1:n] (228, 230, . . . , 232) used to control the settings of the tunable capacitor banks (212, 234).

Figure 4:
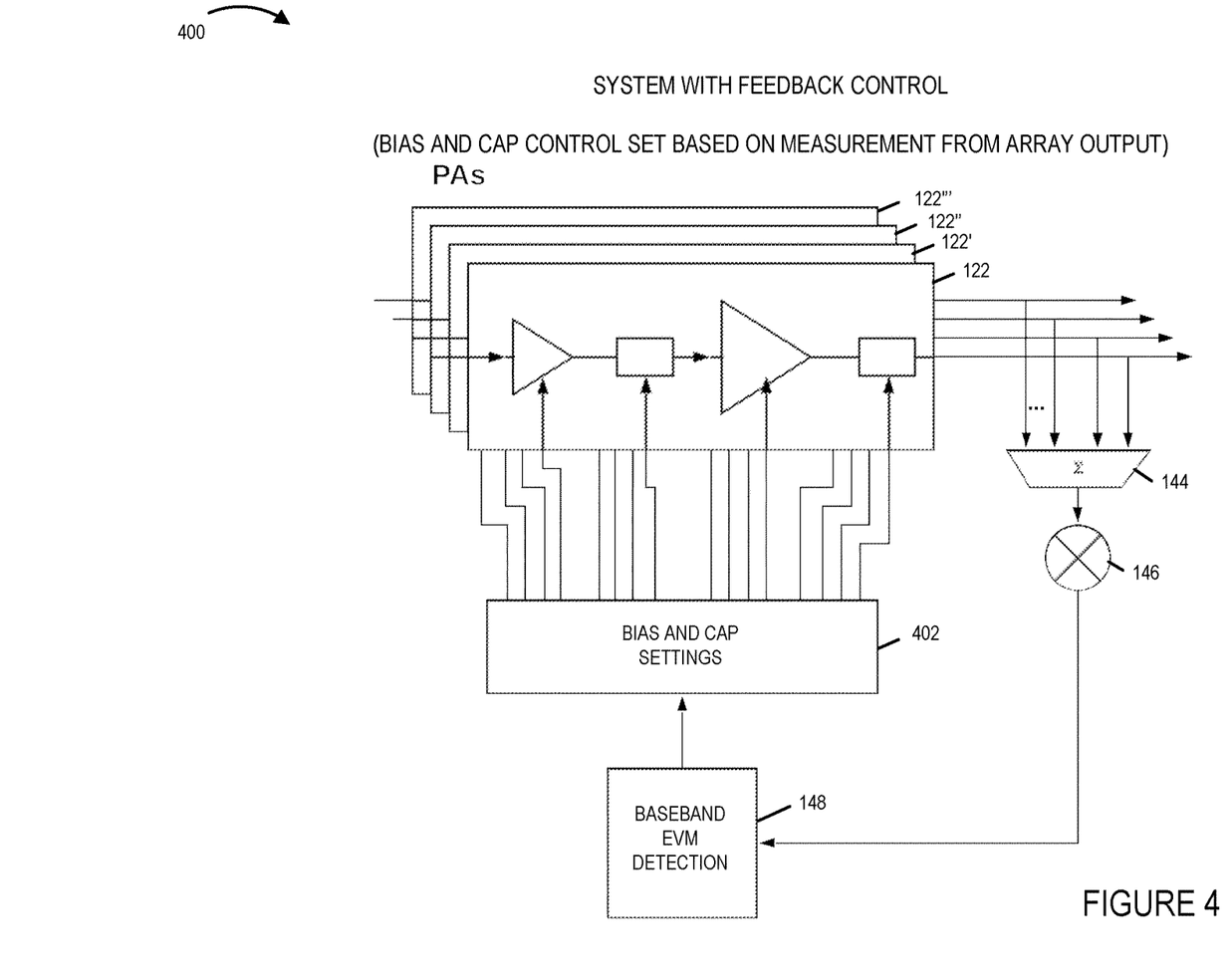
FIG. 4 is a drawing illustrating an exemplary system with feedback control in which bias and cap control settings are based on measurement from an array output, in accordance with an exemplary embodiment.

FIG. 4 is a drawing 400 illustrating an exemplary system with feedback control in which bias and cap control settings are based on measurement from an array output, in accordance with an exemplary embodiment. Outputs for the PAs (122, 122', 122", . . . , 122') in the array are summed by summer 144, combined by mixer 146 and fed into the baseband EVM detection circuit 148, and bias and capacitor settings 402 are selected based on the output of the EVM detection, e.g. adjusted to achieve a low EVM.

Figure 5:
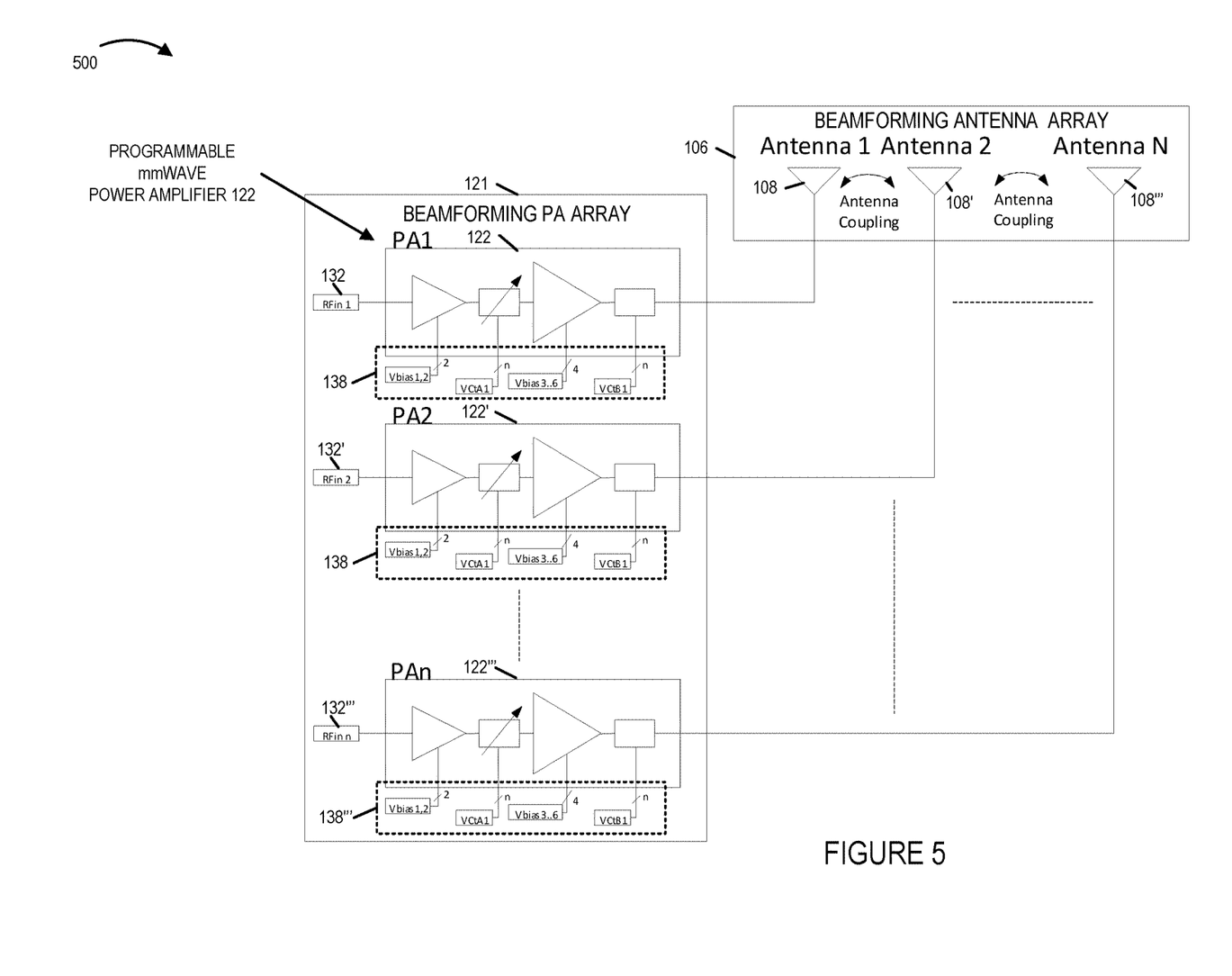
FIG. 5 illustrates an exemplary mmWave programmable Power Amplifier Array concept diagram in accordance with an exemplary embodiment.

FIG. 5 illustrates an exemplary mmWave programmable Power Amplifier Array concept diagram 500 in accordance with an exemplary embodiment. FIG. 5 illustrates a beamforming power array 121 including n programmable mmWave power amplifiers (PAs) (PA1 122, PA2 122', . . . , PAn 122'''). Each programmable PA (PA1 122, PA2 122', . . . , PAn 122") receives an RF input signal (RFin 1 132, RFin 2 132', . . . , RFin n 132"). Each programmable power amplifier (122, 122', . . . , 122''') is configured based on a set (138, 138', . . . , 138") of received control signals (Vbias1, Vbias2, VCtA1, . . . VCtAn, Vbias 3, Vbias 4, Vbias 5, Vbias 6, VCtB1, VCtBn). Different power amps in the array may be, and generally are, configured differently. Each programmable PA (PA1 122, PA2 122', . . . , PAn 122''') processes the received input signal (RFin 1, RFin 2, . . . , RFin n) and outputs and RF output signal (RFout 1 140, RFout 2 140', . . . , RFout n 140'''), which is fed into an antenna (antenna 1 108, antenna 2 108', . . . , antenna N 108"), respectively in the beamforming antenna array 106.

Figure 6:
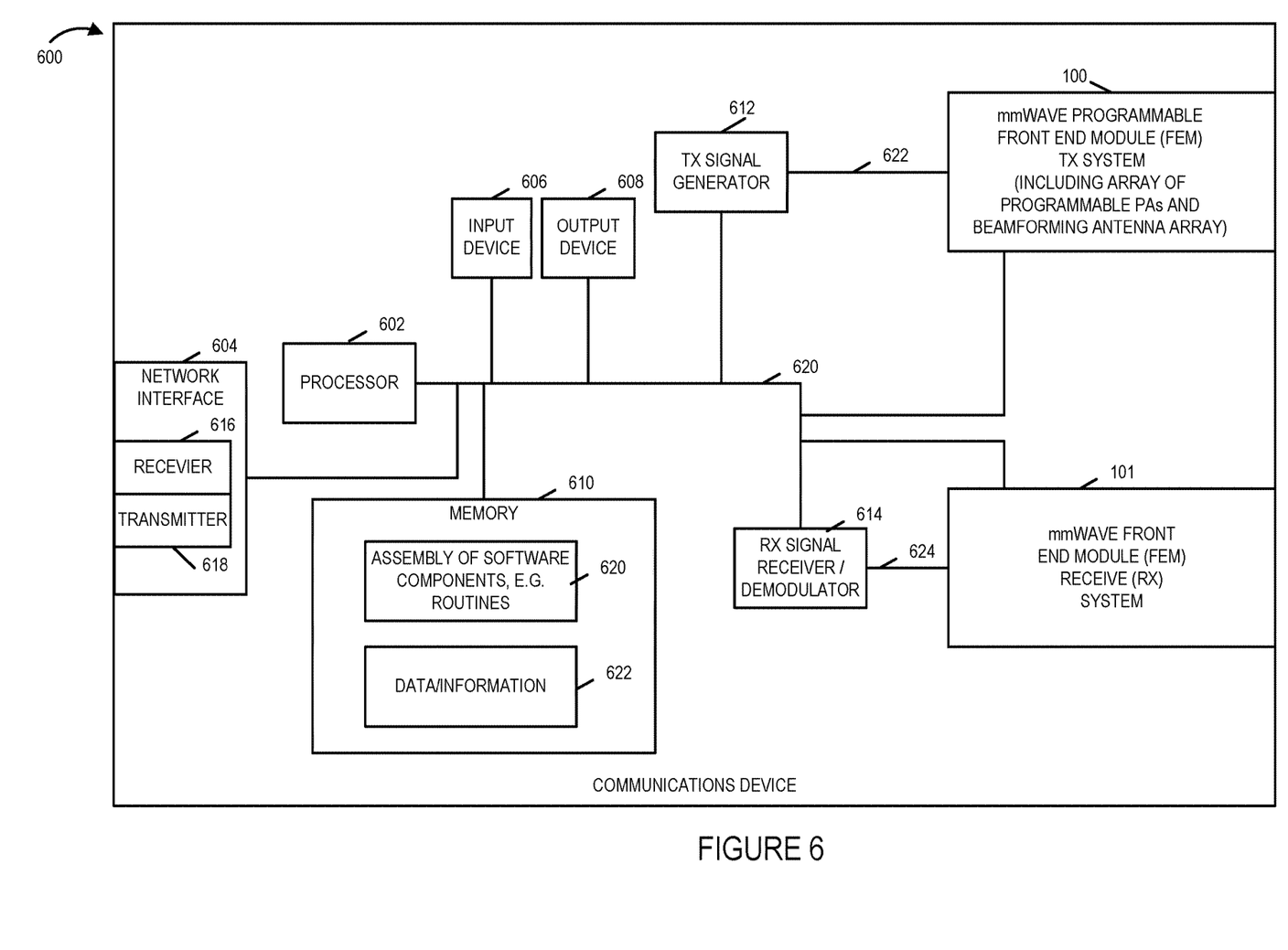
FIG. 6 is a drawing of an exemplary communications device in accordance with an exemplary embodiment.

FIG. 6 is a drawing of an exemplary communications device 600 in accordance with an exemplary embodiment, which includes elements shown in FIGS. 1-5 and additional elements. Exemplary communications device 600 includes a processor 602, e.g., a CPU, a network interface 604, an input device 606, e.g., a keyboard and/or mouse, an output device 608, e.g., a display, memory 610, a TX signal generator 612, a RX signal receiver/demodulator 614, a mmWave programmable front end module (FEM) transmission system 100 including an array of programmable power amplifiers and a beamforming antenna array, and a mmWave front end module (FEM) receive system 102 coupled together via a bus 620 over which the various elements may interchange data and information. The mmWave programmable front end module transmission (TX) system 100 is also coupled to the TX signal generator 612, and the mmWave FEM receive system 101 is also coupled to the RX signal receiver/demodulator 614. FIGS. 1-5 illustrates further detail of the mmWave programmable FEM TX system 100.

Network interface 604 includes a receiver 616 and a transmitter 618. Network interface 604 is, e.g., a wired or fiber optic interface for coupling the communications device to network communications devices. Memory 610 includes assembly of software components 620, e.g., routines for controlling operation of the communications device 600 and data/information 622.

In some embodiments, some components, e.g. controllable gain/phase elements and antenna elements within the transmit system 100 are also used by the receive system 101, e.g. with transmit/receive control switches being included within the communications device 600 and being controlled, e.g., by processor 602. In some embodiments, the transmission system 100 and the receive array 101 are integrated together, e.g., and include an array of T/R front ends.

List of Exemplary Numbered Embodiments

Numbered Embodiment 1. A communications apparatus, the apparatus comprising: an array (102) of N beamforming circuits (104, 104', 104", 104'"), each of the N beam forming circuits (104, 104', 104", 104'") including an RF signal input (132, 132', 132" or 132'") coupled to a phase shifter (e.g., 118), an attenuator (e.g., 120) and a power amplifier circuit (e.g., 122), N being an integer greater than 1; an array (106) of antenna elements (108, 108', 108", 108'"), each one of the N beamforming circuits (104, 104', 104", 104'") including an output (140, 140', 140", 140'") coupled to a different one of the antenna elements (108, 108', 108", 108') in the array (106) of antenna elements; a beam angle selector (112) that generates a control signal based on a beam angle to be used; and one or more beam tables (114, 114', 114", 114'") including control values used to selectively control elements of the beamforming circuits, said one or more beam tables being responsive to said control signal to output values used in controlling the N beam forming circuits.

Numbered Embodiment 2. The communications apparatus of Numbered Embodiment 1, wherein said one or more beam tables includes a set (112) of beam tables that includes multiple beam tables (114, 114', 114", 114').

Numbered Embodiment 3. The communications apparatus of Numbered Embodiment 1, wherein said control signal from the beam angle selector acts as an index into the one or more beam angle tables thereby controlling which values in the one or more beam tables (114, 114', 114", 114'") are output and used in controlling the N beam forming circuits.

Numbered Embodiment 4. The communications apparatus of Numbered Embodiment 3, further comprising: a feedback circuit (116), coupled to the outputs (140, 140', 140", 140') of the beam forming circuits (104, 104', 104", 104'"), said feedback circuit (116) generating a feedback signal (140) used to determine or select one or more of i) bias values or ii) capacitance control values used to control one or more power amplifiers (122, 122', 122", 122') included in the array (102) of N beamforming circuits (104, 104' 104", 104'").

Numbered Embodiment 5. The communications apparatus of Numbered Embodiment 3, wherein said set (112) of beam tables (114, 114', 114", or 114'") includes for each of the N beamforming circuits (104, 104', 104", 104'"): i) a set of phase control values.

Numbered Embodiment 6. The communications apparatus of Numbered Embodiment 5, wherein said set (112) of beam tables (114, 114', 114", 114'") includes for each of the N beamforming circuits (104, 104' 104", 104'): ii) a set of attenuation control values.

Numbered Embodiment 7. The communications apparatus of Numbered Embodiment 5, wherein said set (112) of beam tables (114, 114', 114", 114') includes for each of the N beamforming circuits (104, 104', 104", 104'"): iii) a set of bias and/or capacitance control values.

Numbered Embodiment 8. The communications apparatus of Numbered Embodiment 4, wherein said feedback circuit (116) includes a summer (144) coupled to a mixer (146) which mixes a signal from the summer (144) with an oscillator signal to produce a baseband signal supplied to a baseband EVM detection circuit 148 included in the feedback circuit (116).

Numbered Embodiment 9. The communications apparatus of Numbered Embodiment 8, wherein the baseband EVM detection circuit (148) includes an output which is coupled to a feedback loop control signal input of the set 112 of beam tables (114, 114', 114" and 114'").

Numbered Embodiment 10. The communications apparatus of Numbered Embodiment 9, wherein the beam angle selector (112) includes a control output coupled to control inputs of the beam tables (114, 114', 114" and 114'").

Numbered Embodiment 11. The communications apparatus of Numbered Embodiment 4, wherein said set (112) of beam tables (114, 114', 114", 114'") includes N beam tables, each of the N beam tables (114, 114', 114", 114'") corresponding to a different one of the N beam forming circuits (104, 104', 104", 104"), different beam tables being used for power amplifier circuits (e.g., 122, 122', 122", 122'") of different beam forming circuits (104, 104', 104", 104'").

Numbered Embodiment 12. The communications apparatus of Numbered Embodiment 11, wherein a first beam table (114) corresponding to the first beamforming circuit (104) includes a first set of bias voltage control values for controlling the first driver amplifier (124) and a second set of bias voltage control values for controlling the first output stage amplifier (128) of the first power amplifier circuit (122).

Numbered Embodiment 13. The communications apparatus of Numbered Embodiment 3, wherein a power amplifier circuit (122) of a first one (104) of the N beam forming circuits includes a first driver amplifier (124) coupled to a first output stage amplifier (128).

Numbered Embodiment 14. The communications apparatus of Numbered Embodiment 13, wherein a first beam table (114) corresponding to the first beamforming circuit (104) includes a first set of bias voltage control values for controlling the first driver amplifier (124) and a second set of bias voltage control values for controlling the first output stage amplifier (128) of the first power amplifier circuit (122).

Numbered Embodiment 15. The communications apparatus of Numbered Embodiment 13, wherein first power amplifier circuit (122) further include a first tunable capacitance circuit (126) coupling the first driver amplifier (124) to the first output stage amplifier (128).

Numbered Embodiment 16. The communications apparatus of Numbered Embodiment 15, wherein first power amplifier circuit (122) further include a second tunable capacitance circuit (130) coupling the first output stage amplifier (128) to an antenna element (108).

Numbered Embodiment 17. The communications apparatus of Numbered Embodiment 16, wherein beam table values used to control components of the first power amplifier circuit (122) are processed by a bias mapping table (310) which is coupled to elements of said first power amplifier circuit (122) by digital to analog converters (DACs) (312, 314, 316, 318, 320, 322).

Numbered Embodiment 18. The communications apparatus of Numbered Embodiment 17, wherein the N individual power amplifier circuits (122, 122', 122", 122'") corresponding to different ones of the N beamforming circuits (104, 104', 104", 104'"), are controlled using separate sets of control values.

The techniques of various embodiments may be implemented using software, hardware and/or a combination of software and hardware. Various embodiments are directed to apparatus and/or systems, e.g., communications devices, wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., access point, with a processor which includes a component corresponding to each of the steps of the various described methods performed by the device in which the processor is included. In some but not all embodiments a device, e.g., wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications apparatus, the apparatus comprising:
   an array of N beamforming circuits, each of the N beamforming circuits including an RF signal input coupled to a phase shifter, an attenuator and a power amplifier circuit, N being an integer greater than 1;

an array of antenna elements, each one of the N beamforming circuits including an output coupled to a different one of the antenna elements in the array of antenna elements;
a beam angle selector that generates a control signal based on a beam angle to be used; and
a set of beam tables including control values used to selectively control elements of the beamforming circuits, said set of beam tables being responsive to said control signal to output values used in controlling the N beamforming circuits, said set of beam tables including multiple beam tables.

2. The communications apparatus of claim 1, wherein said control signal from the beam angle selector acts as an index into one or more beam tables included in said set of beam tables thereby controlling which values in the one or more beam tables are output and used in controlling at least one beamforming circuit in the N beamforming circuits.

3. The communications apparatus of claim 1, further comprising:
a feedback circuit, coupled to the outputs of the beamforming circuits, said feedback circuit generating a feedback signal used to determine or select one or more of: i) bias values or ii) capacitance control values used to control one or more power amplifiers included in the array of N beamforming circuits.

4. The communications apparatus of claim 1, wherein said set of beam tables includes for each of the N beamforming circuits: i) a set of phase control values.

5. The communications apparatus of claim 4, wherein said set of beam tables further includes for each of the N beamforming circuits: ii) a set of attenuation control values.

6. The communications apparatus of claim 4, wherein said set of beam tables further includes for each of the N beamforming circuits: iii) a set of bias and/or capacitance control values.

7. The communications apparatus of claim 3, wherein said feedback circuit includes a summer coupled to a mixer which mixes a signal from the summer with an oscillator signal to produce a baseband signal supplied to a baseband EVM detection circuit included in the feedback circuit.

8. The communications apparatus of claim 7, wherein the baseband EVM detection circuit includes an output which is coupled to a feedback loop control signal input of the set of beam tables.

9. The communications apparatus of claim 8, wherein the beam angle selector includes control outputs coupled to corresponding control inputs of the set of beam tables.

10. The communications apparatus of claim 3, wherein said set of beam tables includes N beam tables, each of the N beam tables corresponding to a different one of the N beamforming circuits, different beam tables being used for power amplifier circuits of different beamforming circuits.

11. The communications apparatus of claim 10, wherein the set of beam tables includes a first beam table corresponding to a first beamforming circuit, the first beam table including i) a first set of bias voltage control values for controlling a first driver amplifier and ii) a second set of bias voltage control values for controlling a first output stage amplifier of a first power amplifier circuit.

12. The communications apparatus of claim 2, wherein a power amplifier circuit of a first one of the N beamforming circuits includes a first driver amplifier coupled to a first output stage amplifier.

13. The communications apparatus of claim 12, wherein the set of beam tables include a first beam table, said first beam table corresponding to the first beamforming circuit, the first beam table including: i) a first set of bias voltage control values for controlling the first driver amplifier and ii) a second set of bias voltage control values for controlling the first output stage amplifier of the first power amplifier circuit.

14. The communications apparatus of claim 12, wherein first power amplifier circuit further include a first tunable capacitance circuit coupling the first driver amplifier to the first output stage amplifier.

15. The communications apparatus of claim 14, wherein first power amplifier circuit further include a second tunable capacitance circuit coupling the first output stage amplifier to an antenna element.

16. The communications apparatus of claim 15, wherein beam table values used to control components of the first power amplifier circuit are processed by a bias mapping table which is coupled to elements of said first power amplifier circuit by digital to analog converters (DACs).

17. The communications apparatus of claim 16, wherein N individual power amplifier circuits corresponding to different ones of the N beamforming circuits, are controlled using separate sets of control values.

* * * * *